WILLIAM DEVINES.
Scrubbing Brushes.
No. 116,030.                                Patented June 20, 1871.
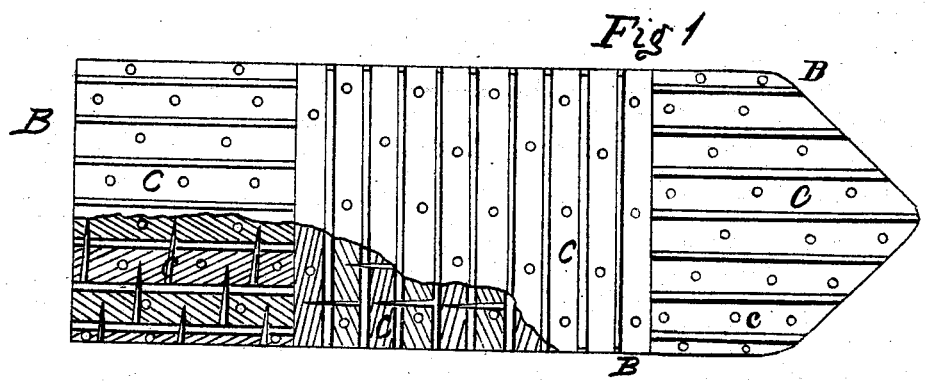
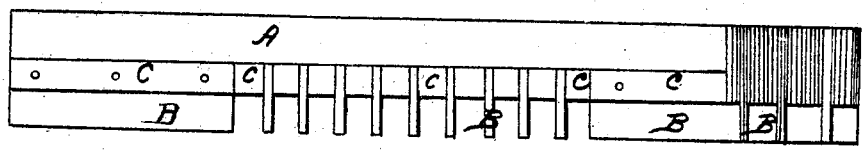

UNITED STATES PATENT OFFICE.

WILLIAM DEVINES, OF WILLIAMSBURG, NEW YORK.

IMPROVEMENT IN SCRUBBING-BRUSHES.

Specification forming part of Letters Patent No. 116,030, dated June 20, 1871.

*To all whom it may concern:*

Be it known that I, WILLIAM DEVINES, of Williamsburg, in the county of Kings and State of New York, have invented a new and useful Improvement in Scrubbing-Brush, &c.; and I do hereby declare that the following is a full, clear, and exact description thereof, which will enable others skilled in the art to make and use the same, reference being had to the accompanying drawing forming part of this specification, in which—

Figure 1 is a bottom or under-side view of my improved scrubbing-brush, partly in section, to show the manner in which the rubber flanges are attached to the back of the brush. Fig. 2 is an edge view of the same.

Similar letters of reference indicate like parts.

My invention has for its object to furnish an improved brush for scrubbing and similar purposes, which will last longer and do better work than the scrubbing-brushes now in use; and it consists of a scrubbing-brush the brush of which is formed of strips of rubber or equivalent material attached to the back of the brush, in connection with strips of wood, in the manner hereinafter more fully described.

A is the back of the brush, which is made in the ordinary shape and manner. The brush or scrubbing part is formed of strips or flanges of rubber B or its equivalent. In the central part of the brush these strips or flanges run across the brush, but at the ends they run longitudinally, as shown in the drawing. The rubber strips B are secured to the strips of wood C between which they are placed by rubber cement. They are also further secured to the strips C by nails passing through the strips C and flanges B horizontally, as shown in the drawing. The strips C are also secured to the back A of the brush by nails or screws, as shown.

By this means all the parts of the brush are securely attached to each other, and a firm, substantial brush produced.

The strips B are made lighter or heavier, and with more or less elasticity, according to the character of the work for which the brush is intended.

I claim as new and desire to secure by Letters Patent—

A scrubbing-brush with its ordinary back A, constructed with longitudinal strips of India rubber B on each end and transverse strips of rubber B in the middle, sustained and held by strip C, as shown and described.

WM. DEVINES.

Witnesses:
   WM. F. MCNAMARA,
   JAMES T. GRAHAM.